United States Patent
Baek et al.

(10) Patent No.: US 9,807,542 B2
(45) Date of Patent: Oct. 31, 2017

(54) METHOD FOR OPERATING APPLICATION AND ELECTRONIC DEVICE THEREOF

(71) Applicant: Samsung Electronics Co., Ltd., Suwon-si, Gyeonggi-do (KR)

(72) Inventors: In-Ho Baek, Yongin-si (KR); Seo-Yeon Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/551,530

(22) Filed: Nov. 24, 2014

(65) Prior Publication Data
US 2015/0147964 A1  May 28, 2015

(30) Foreign Application Priority Data
Nov. 27, 2013 (KR) .................. 10-2013-0145363

(51) Int. Cl.
*H04B 5/00* (2006.01)
*H04W 4/00* (2009.01)

(52) U.S. Cl.
CPC .......... *H04W 4/008* (2013.01); *H04B 5/0031* (2013.01)

(58) Field of Classification Search
CPC .............................. H04L 67/16; H04W 4/008
USPC ................................................ 455/41.1, 41.2
See application file for complete search history.

(56) References Cited

U.S. PATENT DOCUMENTS

| | | | |
|---|---|---|---|
| 6,915,119 B1* | 7/2005 | Konishi | H04M 1/72555 455/127.1 |
| 8,805,279 B2 | 8/2014 | Choi et al. | |
| 2004/0058716 A1* | 3/2004 | Son | H04N 1/2112 455/566 |
| 2010/0019482 A1* | 1/2010 | Kumagai | G06Q 30/02 283/72 |
| 2012/0208461 A1* | 8/2012 | Choi | H04W 4/008 455/41.2 |
| 2013/0201123 A1* | 8/2013 | Jung | G06F 3/0488 345/173 |
| 2015/0031288 A1* | 1/2015 | Tubbesing | H04W 4/008 455/41.1 |
| 2015/0200715 A1* | 7/2015 | Oiwa | H04M 1/7253 455/41.1 |
| 2015/0277690 A1* | 10/2015 | Fujiwara | G06F 3/0485 715/784 |

FOREIGN PATENT DOCUMENTS

| | | |
|---|---|---|
| KR | 10-2012-0092366 A | 8/2012 |
| KR | 10-2013-0043990 A | 5/2013 |

* cited by examiner

*Primary Examiner* — Edward Urban
*Assistant Examiner* — Max Mathew
(74) *Attorney, Agent, or Firm* — Jefferson IP Law, LLP

(57) ABSTRACT

An operating method of an electronic device is provided. The method includes selecting a file generated by the electronic device or received from another electronic device and transmitting file information based on the file to a memory device through short range communication.

20 Claims, 14 Drawing Sheets

METHOD FOR OPERATING APPLICATION AND ELECTRONIC DEVICE THEREOF

CROSS-REFERENCE TO RELATED APPLICATION(S)

This application claims the benefit under 35 U.S.C. §119 (a) of a Korean patent application filed on Nov. 27, 2013 in the Korean Intellectual Property Office and assigned Serial number 10 -2013-0145363, the entire disclosure of which is hereby incorporated by reference.

TECHNICAL FIELD

The present disclosure relates to a method for operating an application and an electronic device thereof.

BACKGROUND

Recently, with the development of multimedia technology, electronic devices having various functions have been introduced. Such electronic devices have a convergence function for performing a combination of one or more functions.

Furthermore, mobile terminals roughly divided into so-called 'smart phones' are mainly used as electronic devices. Especially, such mobile terminals are equipped with a large screen touch type display module. Furthermore, in addition to a basic function such as communication with another party, such mobile terminals provide still image and video capturing functions with a high-pixel camera module. Moreover, such mobile terminals may play multimedia contents such as music and video and perform web surfing by accessing a network.

Such electronic devices have advanced to perform various convergence functions faster as they are increasingly equipped with high-performance processors.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to provide at least the advantages described below. Accordingly, an aspect of the present disclosure is to provide a method and electronic device for operating an application using short range communication with a memory device.

Another aspect of the present disclosure is to provide a method and electronic device for operating an application with security.

Another aspect of the present disclosure is to provide a user interface operating intuitively in an electronic device.

According to an aspect of the present disclosure, an operating method of an electronic device is provided. The method includes selecting a file generated by the electronic device or received from another electronic device and transmitting file information based on the file to a memory device through short range communication.

According to an aspect of the present disclosure, the file information may include at least one of a file path for the file, a file name, a file format, a file size, a storage location, a creation date, and terminal information.

According to an aspect of the present disclosure, the method may further include reading the file information of the memory device by using the short range communication and executing the file by using at least one of the file path, the file name, the file format, the file size, the storage location, the creation date, and the terminal information included in the file information.

According to an aspect of the present disclosure, the method may further include changing an output mode of the electronic device at a time of reading the file information from the memory device.

According to an aspect of the present disclosure, the method may further include determining whether a file corresponding to the file information read from the memory device exists in the electronic device.

According to an aspect of the present disclosure, the method may further include, when the file corresponding to the file information read from the memory device does not exist in the electronic device, outputting notification information notifying that there is no file.

According to an aspect of the present disclosure, the memory device may include a near field communication (NFC) tag.

According to an aspect of the present disclosure, the method may further include generating the file by using a pre-loaded application.

According to an aspect of the present disclosure, the pre-loaded application may be executed by a physical button disposed at one side of the electronic device.

According to an aspect of the present disclosure, the file may include at least one of a text file, an image file, a video file, and a voice file.

In accordance with another aspect of the present disclosure, an electronic device is provided. The electronic device includes at least one wireless communication module, a memory, and at least one processor, wherein the at least one processor is configured to select a file generated by the electronic device or received from another electronic device and to transmit file information based on the file to a memory device through short range communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
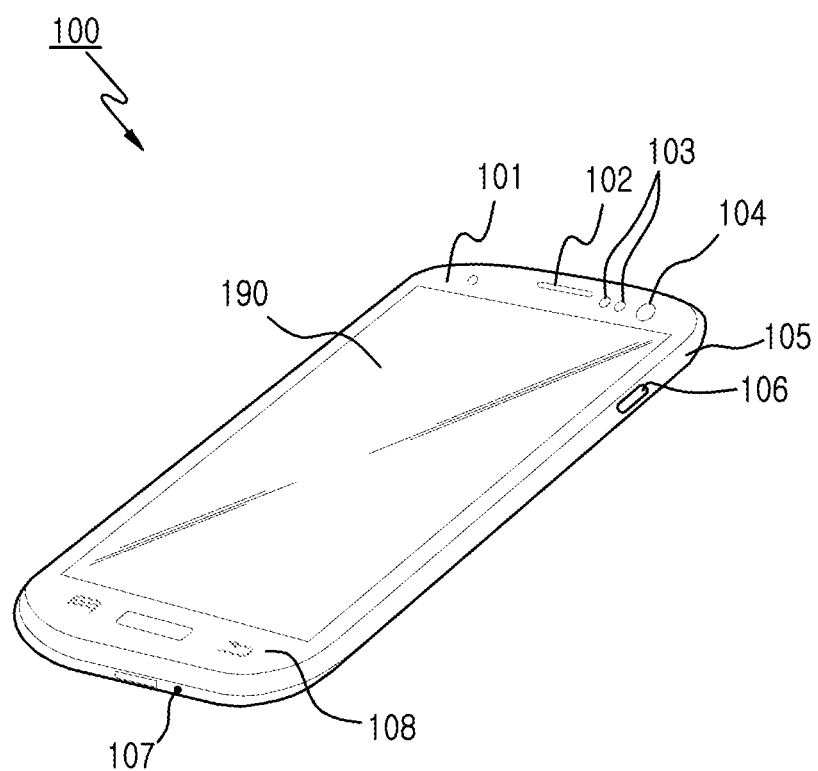
FIG. 1 is a perspective view of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the present disclosure, an electronic device that applies a display device as a display unit is shown and described but the present disclosure is not limited thereto. For example, the electronic device may include at least one of smartphones including at least one communication module, tablet personal computers (PCs), mobile phones, video phones, e-boot readers, desktop PCs, laptop PCs, netbook computers, personal digital assistants (PDAs), portable media players (PMPs), MP3 players, jewelries, electronics Appcessories, cameras, wearable devices, watches, refrigerators, air conditioners, vacuum cleaners, artificial intelligence robots, televisions (TVs), digital versatile disk (DVD) players, audios, ovens, microwaves, washing machines, microwave bracelets, electronic necklaces, air purifiers, electronic picture frames, medical equipment, navigation equipment, satellite signal receivers, event data recorders (EDRs), flight data recorders (FDRs), set-top boxes, TV boxes, electronic dictionaries, automotive infotainment devices, marine electronic equipment, avionics equipment, security equipment, electronic garments, electronic keys, camcorders, game consoles, head-mounted displays (HMDs), flat panel displays, electronic albums, part of furniture or building/structure including an electronic device, electronic boards, electronic signature input devices, and projectors.

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a perspective view of an electronic device according to an embodiment of the present disclosure.

Referring to FIG. 1, an electronic device 100 including a display device 190 at a front 101 portion thereof is illustrated. The display device 190 may display electrical signals delivered from the electronic device 100 as an image, such as text, graphics, and video. Additionally, the display device 190 may be implemented with a touch screen where simultaneous data input/output is possible by applying a tech sensor technique.

An ear piece 102 for outputting sounds, such as a voice, may be installed at a top of the display device 190 and a plurality of sensors 103 for ease of use. For example, the plurality of sensors 103 may include a proximity sensor or an illumination sensor. Additionally a camera module 104 may be installed around the ear piece 102.

According to an embodiment of the present disclosure, a physical button 106 for executing a specific application of the electronic device 100 may be disposed at a side 105 of the electronic device 100. Such a physical button 106 may be used for a hot key but is not limited thereto.

The electronic device 100 may further include a microphone device 107 disposed at a bottom of the display device 190 and a keypad device 108 where key buttons are disposed. However, the present disclosure is not limited thereto and it is apparent that various additional devices for implementing other well-known additional functions may be further included in the electronic device 100.

Figure 2:
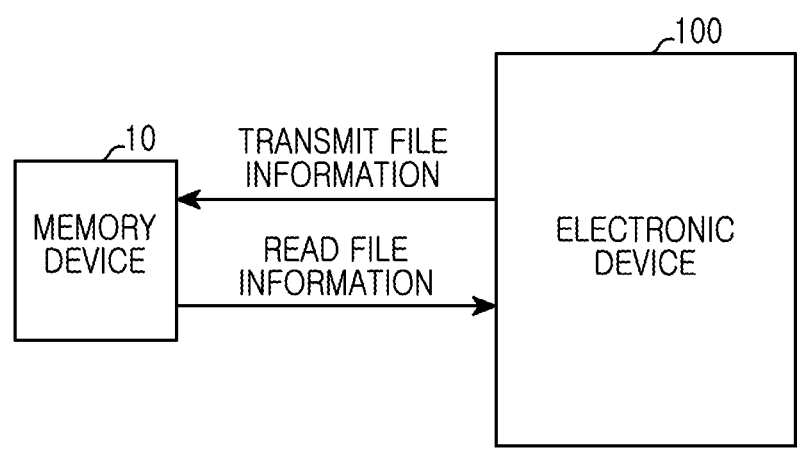
FIG. 2 is a reference view illustrating an operating method between a memory device and an electronic device according to an embodiment of the present disclosure.

FIG. 2 is a reference view illustrating an operating method between a memory device and an electronic device according to an embodiment of the present disclosure.

Referring to FIG. 2, an electronic device 100 is illustrated, where the electronic device 100 may include at least one communication module to perform short range communication with a memory device 10. Such short range communication method may include NFC, Bluetooth communication, and Wi-Fi direct communication, but is not limited thereto. An NFC tag including an NFC communication module may be included as the memory device 10 but the present disclosure is not limited thereto and may be applied to various other memory devices having short range communication function.

According to an embodiment of the present disclosure, the electronic device 100 may transmit file information of a corresponding file to the memory device 10 or may receive (read) file information of a corresponding file stored in the memory device 10 from the memory device 10 by recognizing the proximity or contact with the memory device 10. For example, when the memory device 10 includes an NFC communication module, the electronic device 100 may enter at least one operating mode among a reader mode, a writer mode, a peer to peer (P2P) mode, and a card emulation mode according to an NFC operating mode and may the perform NFC with the memory device 10.

According to an embodiment of the present disclosure, the electronic device 100 may enter the writer mode during an NFC operating mode and may then transmit file information of a specific file to the memory device 10. Such file information may include a variety of identification information, for example, a file path for a specific file, a file name, a file format, a file size, a storage location, a creation date, and terminal information. For example, the terminal information may include an ID meaning a unique number of the electronic device 100 or International Mobile Equipment Identity (IMEI) information.

According to an embodiment of the present disclosure, the electronic device 100 may enter the reader mode during an NFC operating mode and may then read file information of a specific file stored in the memory device 10 from the memory device 10. Such file information may include a variety of identification information, for example, a file path for specific file, a file name, a file format, a file size, a storage location, a creation date, and terminal information. For example, the terminal information may include the ID or IMEI information meaning the unique number of the electronic device 100. The electronic device 100 may check whether a file path of read file information is a file path stored in a memory of the electronic device 100 and when the file path is in the memory of the electronic device 100, may execute a file located in a corresponding file path. For example, when the file path of the read file information is identical to the file path stored in the memory of the electronic device 100, the electronic device 100 may determine whether the read file information is file information that the electronic device 100 writes or file information that another electronic device (e.g., an external electronic device) writes through terminal information of the read file information. When it is determined that file information read through terminal information is written by another electronic device, the electronic device 100 may not execute a corresponding file located in a file path.

The memory device 10 may include at least one communication module and may obtain file information of a specific file from the electronic device 100. Such file information may be stored in the memory device 10 and pre-stored file information may be replaced with new file information. For example, when the memory device 10 includes an NFC communication module, the memory device 10 may be an NFC tag connected to the electronic device 100 by using a specific frequency but the present disclosure is not limited thereto. The memory device 10 may be configured in a form easily detachable from a predetermined object and may have various forms such as a chip or card form.

In this embodiment, an operating method of the electronic device 100 using NFC is described but the present disclosure is not limited thereto. For example, the electronic device 100 may implement this embodiment through a corresponding communication method according to a communication module included in the memory device 10.

Figure 3:
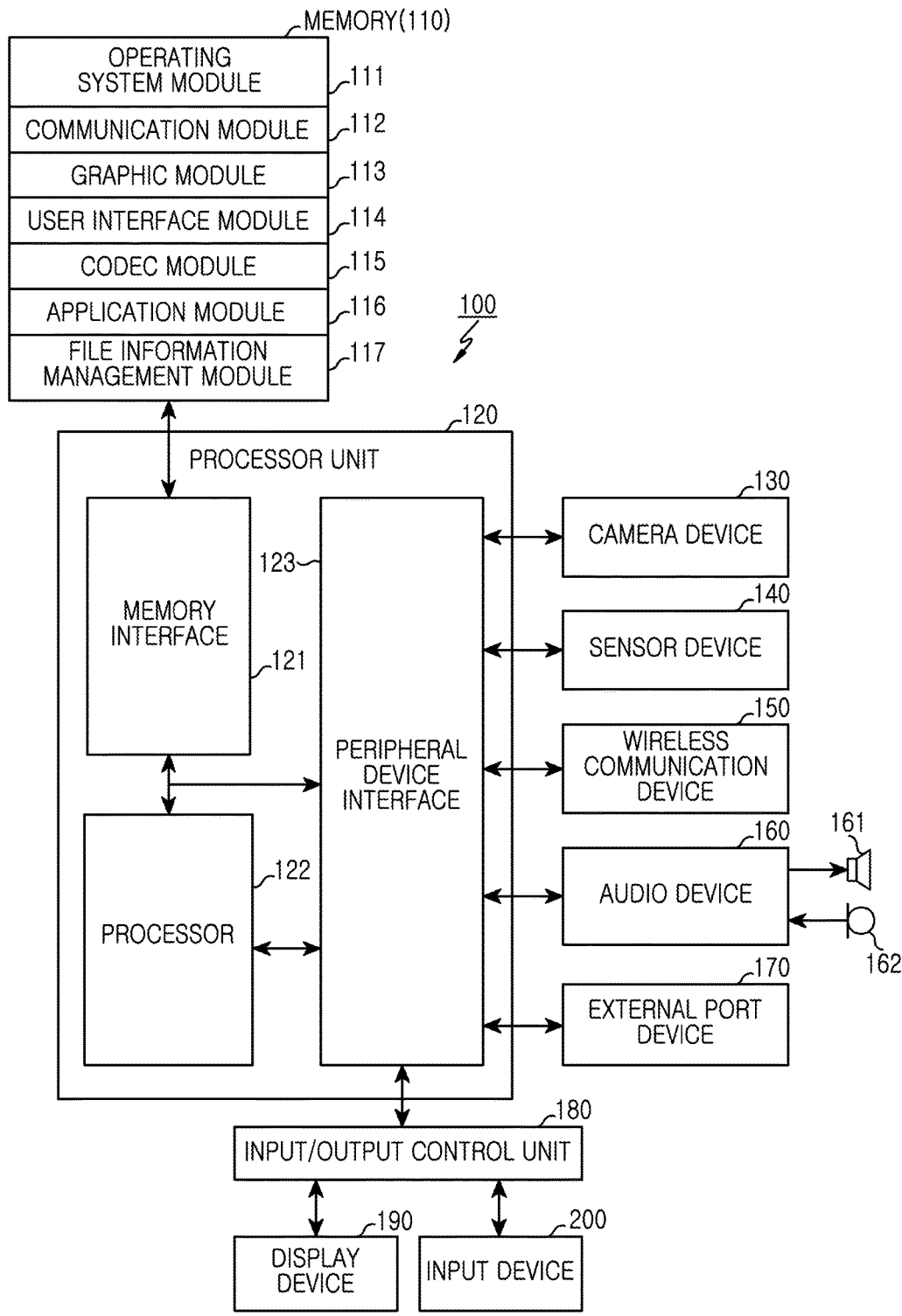
FIG. 3 is a block diagram of an electronic device according to an embodiment of the present disclosure.

FIG. 3 is a block diagram of an electronic device according to an embodiment of the present disclosure.

Referring to FIG. 3, an electronic device 100 is illustrated, where the electronic device 100 may be a device or devices, such as for example, PDAs, laptop computers, mobile phones, smart phones, netbooks, handheld computers, mobile internet devices (MIDs), media players, Ultra-Mobile PCs (UMPCs), Tablet PCs, notebook PCs, wrist watches, navigation devices, MP3s, camera devices, or wearable devices. Additionally, the electronic device 100 may be an arbitrary device including a device combining at least two functions among multiple devices.

According to an embodiment of the present disclosure, the electronic device 100 may include a memory 110, a processor unit 120, a camera device 130, a sensor device 140, a wireless communication device 150, an audio device 160, an external port device 170, an input/output control unit 180, a display device 190, and an input device 200. The memory 110 and the external port device 170 may be configured in plurality.

Each of the above-discussed components of the electronic device 100 are described below.

The processor unit 120 may include a memory interface 121, at least one processor 122, and a peripheral device interface 123. Here, the memory interface 121, at least one processor 122, and the peripheral device interface 123 included in the processor unit 120 may be integrated into at least one circuit and implemented separately.

The memory interface 121 controls an access to the memory 110 of a component such as the processor 122 or the peripheral device interface 123.

The peripheral device interface 123 may control a connection of the processor 122 and the memory interface 121 with an input/output peripheral device of the electronic device 100.

The processor 122 may control the electronic device 100 to provide various multimedia services by using at least one software program. The processor 122 may provide a service corresponding to a corresponding program by executing at least one program stored in the memory 110.

The processor 122 may perform various functions for the electronic device 100 and also may perform processing and control for voice communication, image communication, and data communication by executing several software programs. Furthermore, the processor 122 may perform methods of embodiments of the present disclosure by interworking with software modules stored in the memory 110.

The processor 122 may include at least one data processor, image processor, or coding-decoding (CODEC) processor. Furthermore, the electronic device 100 may be configured with a data processor, an image processor, or CODEC separately.

The processor 122 may include at least one application processor (AP) or at least one communication processor (CP).

Various components of the electronic device 100 may be connected via at least one communication but (not shown) or an electrical connection means (not shown).

The camera device 130 may perform camera functions, for example, picture, video clip, and recording functions. The camera device 130 may include a Charged Coupled Device (CCD) or a Complementary Metal-Oxide Semiconductor (CMOS). Furthermore, the camera device 130 may adjust a change of a hardware configuration according to a camera program that the processor 122 executes, for example, lens movement and a number of apertures.

The camera device 130 may provide a collected image obtained through capturing on an object and may then provide the collected image to the processor unit 120. The camera device 130 may include an image sensor converting optical signals into electrical signals, an image processing device (for example, an image signal processor) converting analog image signals into digital image signals, and a signal processing device (for example, a digital signal processor) performing image processing to allow an image signal outputted from the image processing device to be displayed on the display device 190. Although not shown in the drawings, the camera device 130 may include an actuator moving a lens and a driver integrated circuit (IC) driving the actuator.

The sensor device 140 may include a proximity sensor, a hole sensor, an illumination sensor, and a motion sensor. For example, the proximity sensor may detect an object approaching the electronic device 100 and the hole sensor may detect a magnetic force of metal. Additionally, the illumination sensor may detect light around the electronic device 100 and may include an acceleration sensor or a gyro sensor detecting a movement of the electronic device 100. However, the present disclosure is not limited thereto and the sensor device 140 may further include various sensors for implementing other well-known additional functions.

The wireless communication device 150 may provide wireless communication and may include a wireless frequency transmitter/receiver or an optical (for example, infrared) transmitter/receiver. Although not shown in the drawing, the wireless communication device 150 may include a radio frequency (RF) IC unit and a baseband processing unit. The RF IC unit may transmit/receive electromagnetic waves and may convert baseband signals from the baseband processing unit into electromagnetic waves so as to transmit the electromagnetic waves through an antenna.

The RF IC unit may include an RF transceiver, an amplifier, a tuner, an oscillator, a digital signal processor, a CODEC chip set, or a subscriber identification module (SIM) card.

The wireless communication device 150 may be implemented to operate through at least one of a global system for mobile communications (GSM) network, an enhanced data rates for GSM evolution (EDGE) network, a code division multiple access (CDMA) network, a wideband CDMA (W-CDMA) network, a long term evolution (LTE) network, an orthogonal frequency division multiple access (OFDMA) network, a Wi-Fi network, a worldwide interoperability for microwave access (WiMax) network, an NFC network, an infrared communication network, and a Bluetooth network according to a communication network. The present disclosure is not limited thereto and several communication methods using a protocol for e-mail, instant messaging, or short message service (SMS) may be applied to the wireless communication device 150.

The audio device 160 may be connected to a speaker 161 and a microphone 162 and may perform an audio input and output function, for example, voice recognition, voice replication, digital recording, or call function. The audio device 160 may provide an audio interface between a user and the electronic device 100 and may convert data signals received from the processor 122 into electrical signals to output the converted electrical signals through the speaker 161.

The speaker 161 may convert an electrical signal into an audible frequency band to output audio and may be disposed at a front or rear of the electronic device 100. The speaker 161 may include a flexible film speaker where at least one piezoelectric body is attached to one vibration film.

The microphone 162 may convert sound waves delivered from a person or other sound sources into electrical signals. The audio device 160 may receive electrical signals from the microphone 162 and may convert the received electrical signals into audio data signals to transmit the converted audio data signals to the processor 122. The audio device 160 may include an earphone, an earset, headphone, or a headset debatable from the electronic device 100.

The external port device 170 may connect the electronic device 100 to another electronic device directly or may connect the electronic device 100 to the other electronic device indirectly via a network (for example, internet, intranet, and wireless local area network (LAN)). The external port device 170 may include a universal serial bus (USB) port or a FIREWIRE port.

The input/output control unit 180 may provide an interface between an input/output device (for example, the display device 190 and the input device 200) and the peripheral device interface 123. The input/output control unit 180 may include a display device controller and other input device controller.

The display device 190 may provide an input/output interface between the electronic device 100 and a user. The display device 190 may deliver user's touch information to the processor 122 by applying a touch detection technique and may display visual information, text, graphic, or video provided from the processor 122 to a user.

The display device 190 may display state information of the electronic device 100 or characters, videos, or still images that a user inputs. Furthermore, the display device 190 may display related information of an application executed by the processor 122. The display device 190 may include at least one of a liquid crystal display (LCD), an organic light emitting diode (OLED), an active matrix OLED (AMOLED), a thin film transistor LCD (TFT-LCD), a flexible display, and a 3-D display.

The input device 200 may provide input data generated by a user's selection to the processor unit 122 through the input/output control unit 180. The input device 200 may include a keypad including at least one hardware button and a touch pad detecting touch information.

The input device 200 may include an up/down button for volume control and besides that, the input device 200 may include at least one of a push button assigned with a corresponding function, a local button, a local switch, a thumb-wheel, a dial, a stick, a mouse, a trackball, or a pointer device such as a stylus.

The memory 110 may include high-speed random access memory or nonvolatile memory or at least one optical storage device or flash memory (for example, NAND or NOR).

The memory 110 stores software and such software may include an operating system module 111, a communication module 112, a graphic module 113, a user interface module 114, a codec module 115, an application module 116, and a file information management module 117. The term "module" may be expressed with a set of instructions, an instruction set, or a program.

The operating system module 111 may include an embedded operating system such as WINDOWS™, LINUX™, Darwin™, RTXC™, UNIX™, OS X™, Android™, or VxWorks™ and may include several software components controlling a general system operation. A control of such a general system operation may include memory control and management, storage hardware (device) control and management, and power control and management. Furthermore, the OS module 111 may perform a function for providing smooth communication between various hardware (devices) and various software components (modules)

The communication module 112 may provide communication with the other party electronic device, for example, a computer, the memory device 10, and an electronic device, through the wireless communication device 150 or the external port device 170.

The graphic module 113 provides graphics to the display device 190 and may include several software components for displaying the graphics. The term "graphics" may mean texts, web pages, icons, digital images, videos, and animations.

The user interface module 114 may include several software components relating to a user interface. The user interface module 114 may perform a control to related information of an application executed by the processor 122 on the display device 190. Additionally, the user interface module 114 may include contents on how a state of the user interface changes or in what condition a state of the user interface changes.

The codec module 115 may include software components relating to encoding or decoding of a video file.

The application module 116 may include a software component for at least one application installed in the electronic device 100. Such an application may include browser applications, e-mail applications, phone book applications, game applications, short message service applications, multimedia messaging service applications, social networking service (SNS) applications, instant messaging applications, wake-up call applications, MP3 (for example, MPEG Layer 3) applications, schedule management applications, paint applications, camera applications, word processing applications, keyboard emulation applications, music player applications, video player applications, address book applications, contact list applications, widget applications, digital rights management (DRM) applications, voice recognition applications, voice replication applications, location determination applications, location based service applications, and user authentication service applications. Here, the term "application" may be represented by application program or application software.

The file information management module 117 may include various software components for managing file information for a specific file. The file information management module 117 may include file path information of a corresponding file stored in the memory 110 and, as such file information, may include a variety of identification information, for example, a file path for corresponding file, a file name, a file format, a file size, a creation date, a storage location, and terminal information. For example, the terminal information may include ID or IMEI information meaning the unique number of the electronic device 100.

The processor unit 120 may further include an additional module (or instructions) besides the above-described modules.

Various functions of the electronic device 100 may be executed by hardware or software including, for example, at least one processing or application specific integrated circuit (ASIC).

Although not shown in the drawing, the electronic device 100 may include a power system supplying power to several components included in the electronic device 100. The power system may include a power (AC power or battery) device, a power failure detection circuit, a power converter, a power inverter, a recharging device, or a power status display device (for example, a light emitting diode). Furthermore, the electronic device 100 may include a power management and control device performing a power generation, management and distribution function.

In this embodiment, although the components of the electronic device 100 are shown and described, the present disclosure is not limited thereto. For example, the electronic device 100 may include a larger or smaller number of components than illustrated in the drawings.

Figure 4:
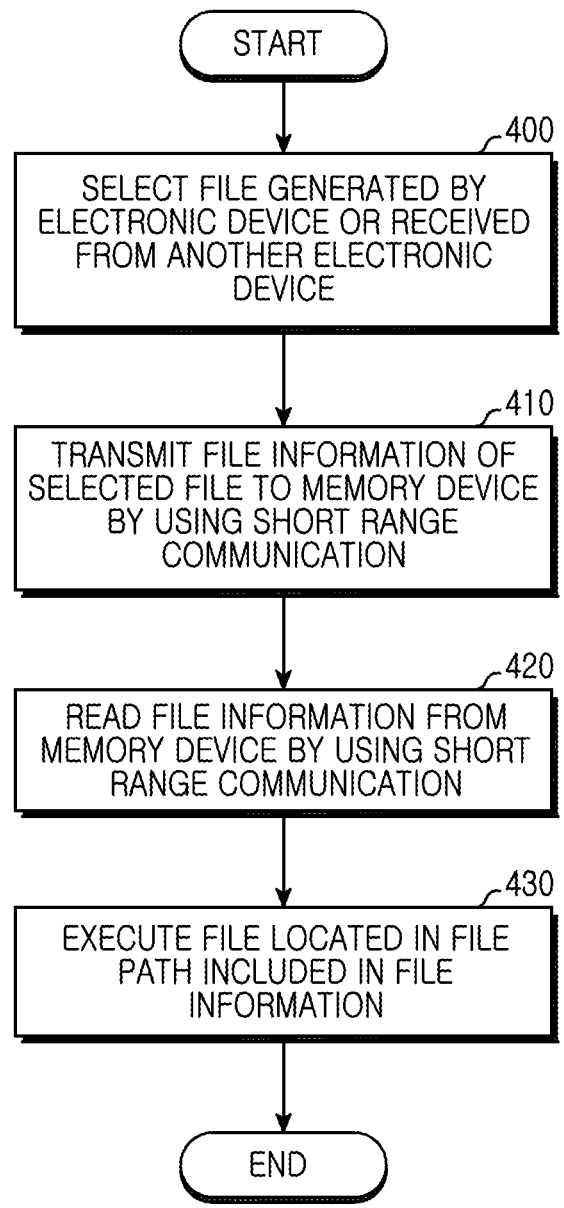
FIG. 4 is a flowchart illustrating an operating method of an electronic device according to an embodiment of the present disclosure.

FIG. 4 is a flowchart illustrating an operating method of an electronic device according to an embodiment of the present disclosure.

Referring to FIG. 4, an operating method of an electronic device 100 is illustrated, where the electronic device 100 may select a file generated by the electronic device 100 or received from another electronic device in operation 400.

Such a file may include at least one of a text file, an image file, a video file, and a voice file.

According to an embodiment of the present disclosure, the electronic device 100 may record voice through an application installed in the electronic device 100. Such an application may be an application preloaded into the electronic device 100. However, the present disclosure is not limited thereto and the electronic device 100 may receive a voice file from a server or the other party electronic device.

The electronic device 100 may transmit file information of the selected file to the memory device 10 through short range communication in operation 410.

According to an embodiment of the present disclosure, the electronic device 100 and the memory device 10 may include a short range communication module and for example, the electronic device 100 may perform NFC with the memory device 10 by recognizing a proximity or contact with the memory device 10. However, the present disclosure is not limited thereto and the electronic device 100 may apply various communication methods according to a short range communication method of the memory device 10.

Additionally, the electronic device 100 may store information of the memory device 10 on the memory 110 of the electronic device 100 while transmitting the file information to the memory device 10.

According to an embodiment of the present disclosure, the file information of a file may include a variety of identification information, for example, a file path for the selected file, a file name, a file format, a file size, a storage location, a creation date, and terminal information but is not limited thereto. For example, the terminal information may include ID or IMEI information meaning the unique number of the electronic device 100.

The electronic device 100 may read file information from the memory device 10 through short range communication in operation 420.

In one embodiment, the electronic device 100 may check terminal information of file information stored in the memory device 10 through short range communication. For example, when a short range communication method is an NFC communication method, the electronic device 100 may enter an NFC read mode and may then read a file path stored in the memory device 10.

The electronic device 100 may execute a file located in the file path included in file information in operation 430.

According to an embodiment of the present disclosure, the electronic device 100 may check whether there is a file at a position corresponding to the file path of the memory device 10. If there is the file located in the file path, the electronic device 100 may play a corresponding file. A playable file type may include at least one of a text file, an image file, a video file, and a voice file.

According to an embodiment of the present disclosure, the electronic device 100 may check whether a file path of read file information is a file path stored in a memory of the electronic device 100 and when the file path is in the memory of the electronic device 100, the electronic device may execute a file located in a corresponding file path. For example, when the file path of the read file information is identical to the file path stored in the memory of the electronic device 100, the electronic device 100 may determine whether the read file information is file information that the electronic device 100 writes or file information that another electronic device writes through terminal information of the read file information. When it is determined that file information read through terminal information is written by another electronic device, the electronic device 100 may not execute a corresponding file located in a file path.

An instruction set for each operation may be stored as at least one module in the memory 110. In this case, a module stored in the memory 110 may be executed by at least one processor 122.

Figure 5:
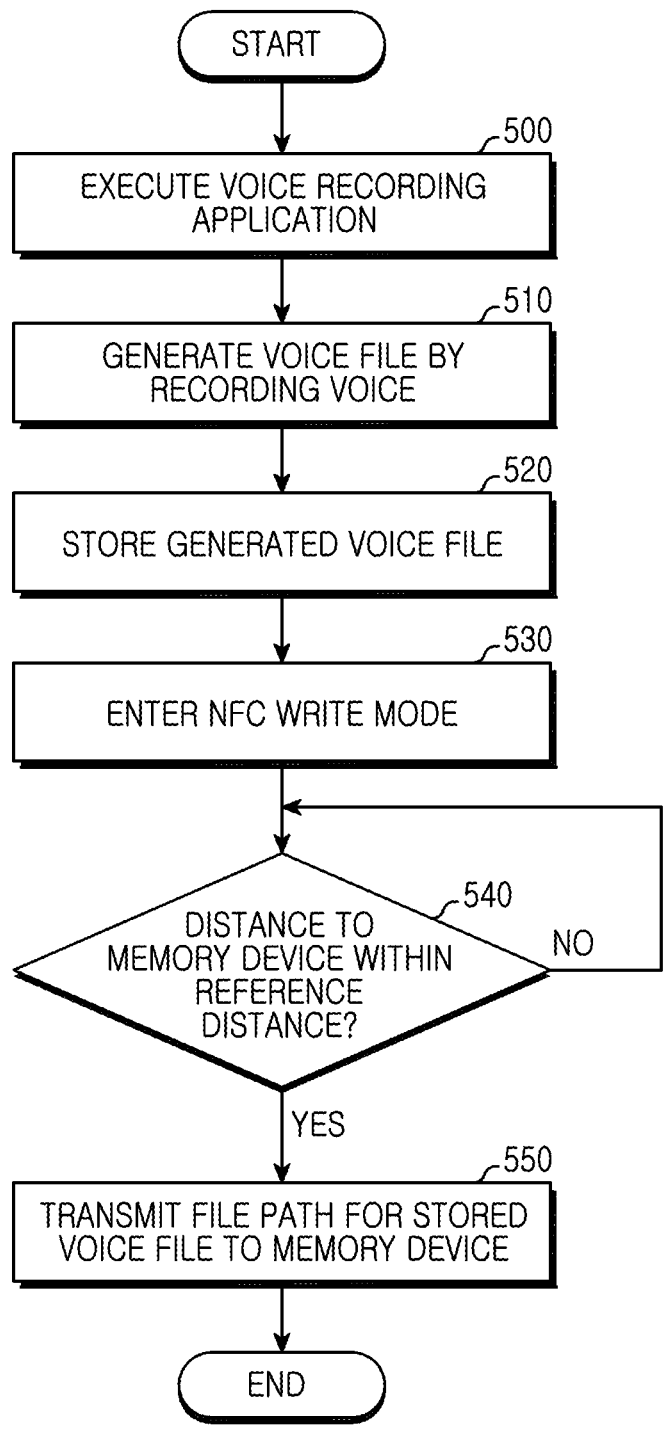
FIG. 5 is a flowchart illustrating an operating method of an electronic device according to an embodiment of the present disclosure.

FIG. 5 is a flowchart illustrating an operating method of an electronic device according to an embodiment of the present disclosure.

Referring to FIG. 5, an operating method of an electronic device 100 is illustrated, where the electronic device 100 may execute a voice recording application in operation 500. The following descriptions of the operations illustrated in FIG. 5 refer to, on numerous occasions, the screen configurations illustrated in FIGS. 7A, 7B, 7C, 7D, 7E, 7F and 7G, where FIGS. 7A-7G illustrate screen configurations of operating methods of the electronic device 100 according to various embodiments of the present disclosure.

Figure 7A:
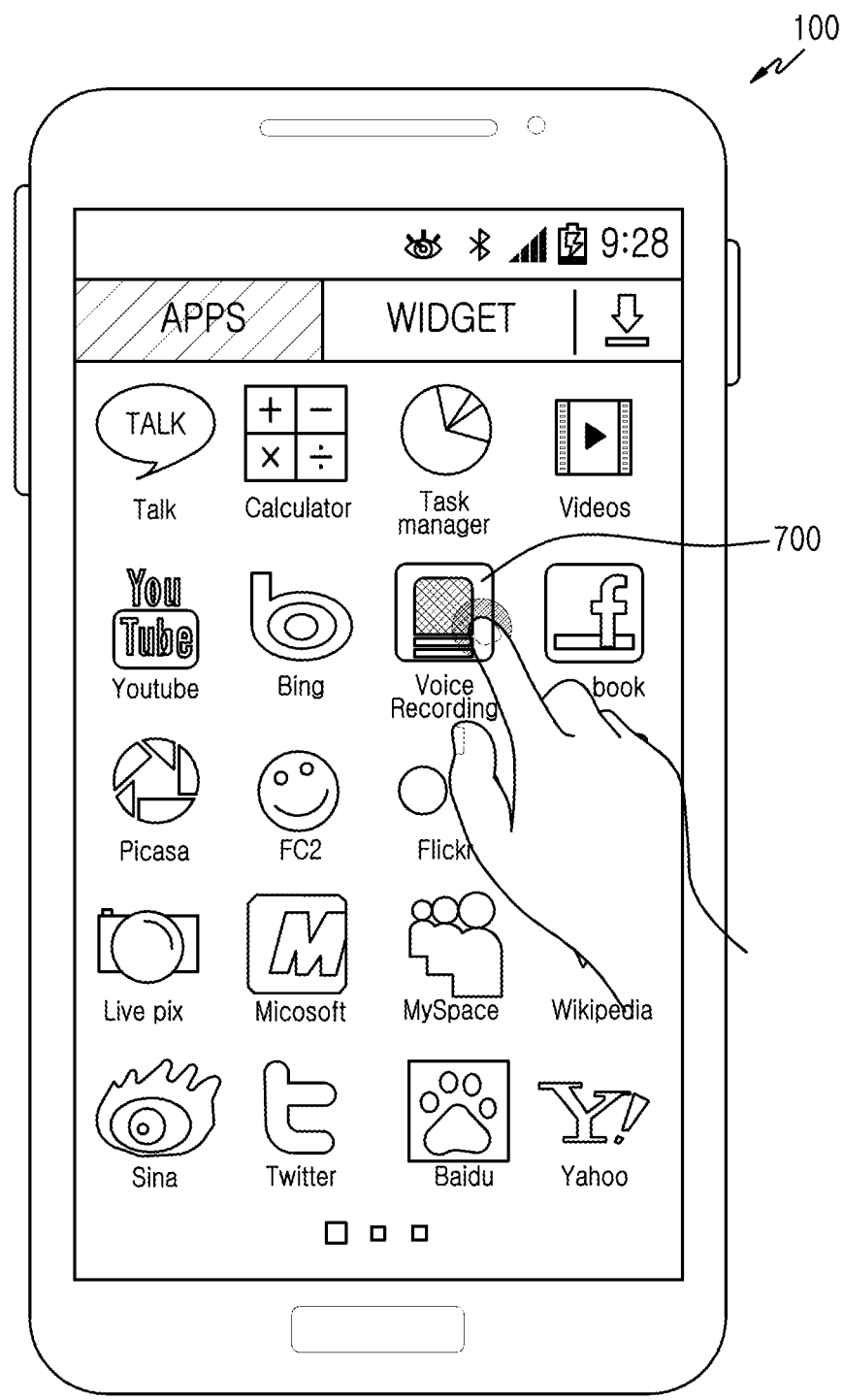
FIGS. 7A, 7B, 7C, 7D, 7E, 7F, and 7G illustrate screen configurations of operating methods of an electronic device according to various embodiments of the present disclosure.

According to an embodiment of the present disclosure, the electronic device 100, as shown in, for example, FIG. 7A, may execute a corresponding application by detecting a touch for a voice recording application 700 (see, for example, FIG. 7A) installed in the electronic device 100. Herein the voice recording application 700 may be an application preloaded into the electronic device 100.

According to an embodiment of the present disclosure, the electronic device 100 may execute the voice recording application 700 through a physical button for executing a specific application disposed at one side of the electronic device 100 instead of a touch method. However, the present disclosure is not limited thereto and the electronic device 100 may execute the voice recording application 700 through various methods.

The electronic device 100 may execute/generate a file located in the file path included in file information in operation 510. For example, in operation 510, the electronic device may generate a voice file by recording a voice.

Figure 7B:
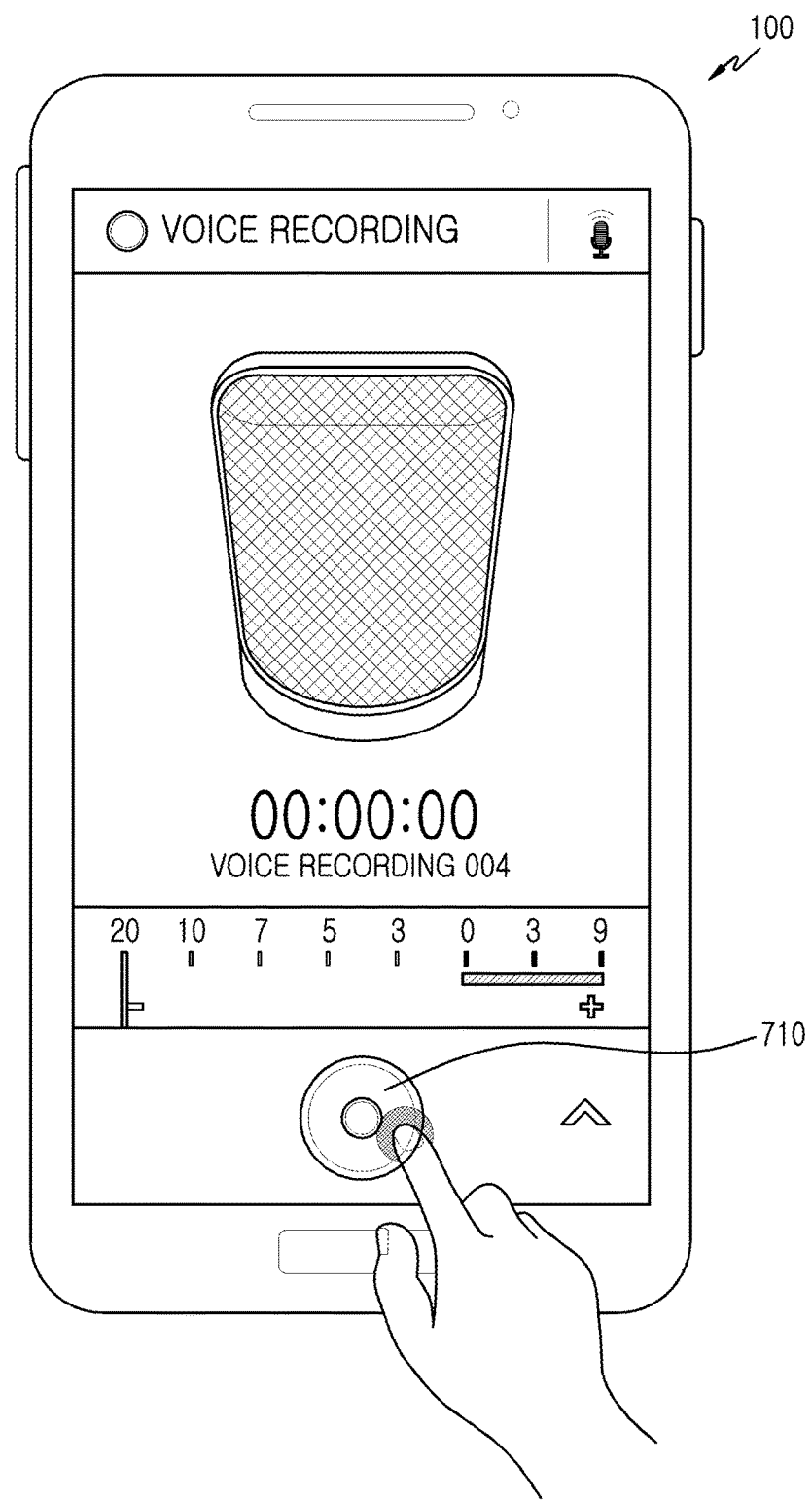

According to an embodiment of the present disclosure, when a voice recording application is executed, a voice recording button 710 may be displayed on a screen of the electronic device 100 as shown in, for example, FIG. 7B. A user may record a voice by executing a voice recording button 710 (see, for example, FIG. 7B) and may generate a voice file according thereto.

The electronic device 100 may store the generated voice file in operation 520.

Figure 7C:
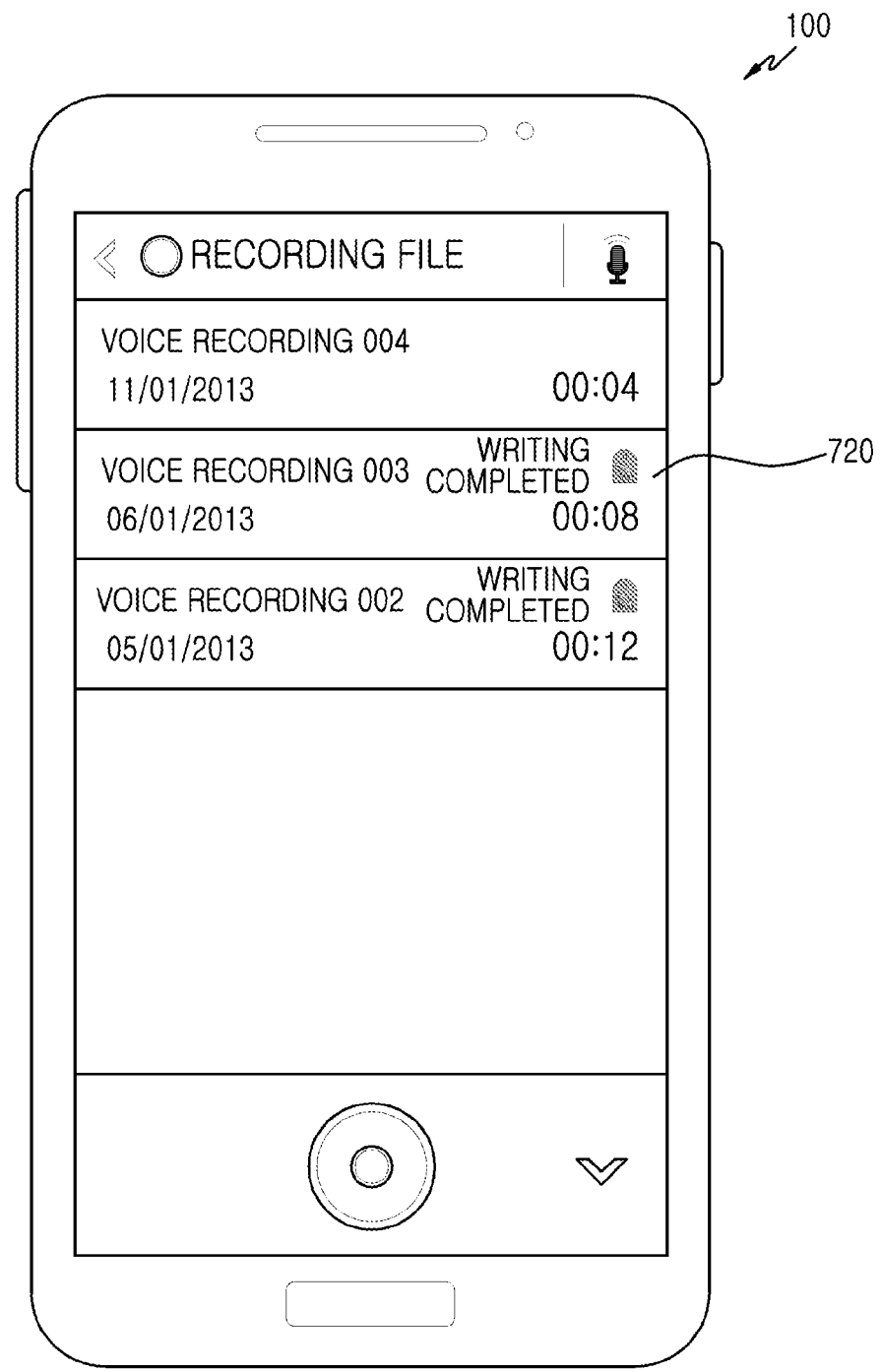
Figure 7D:
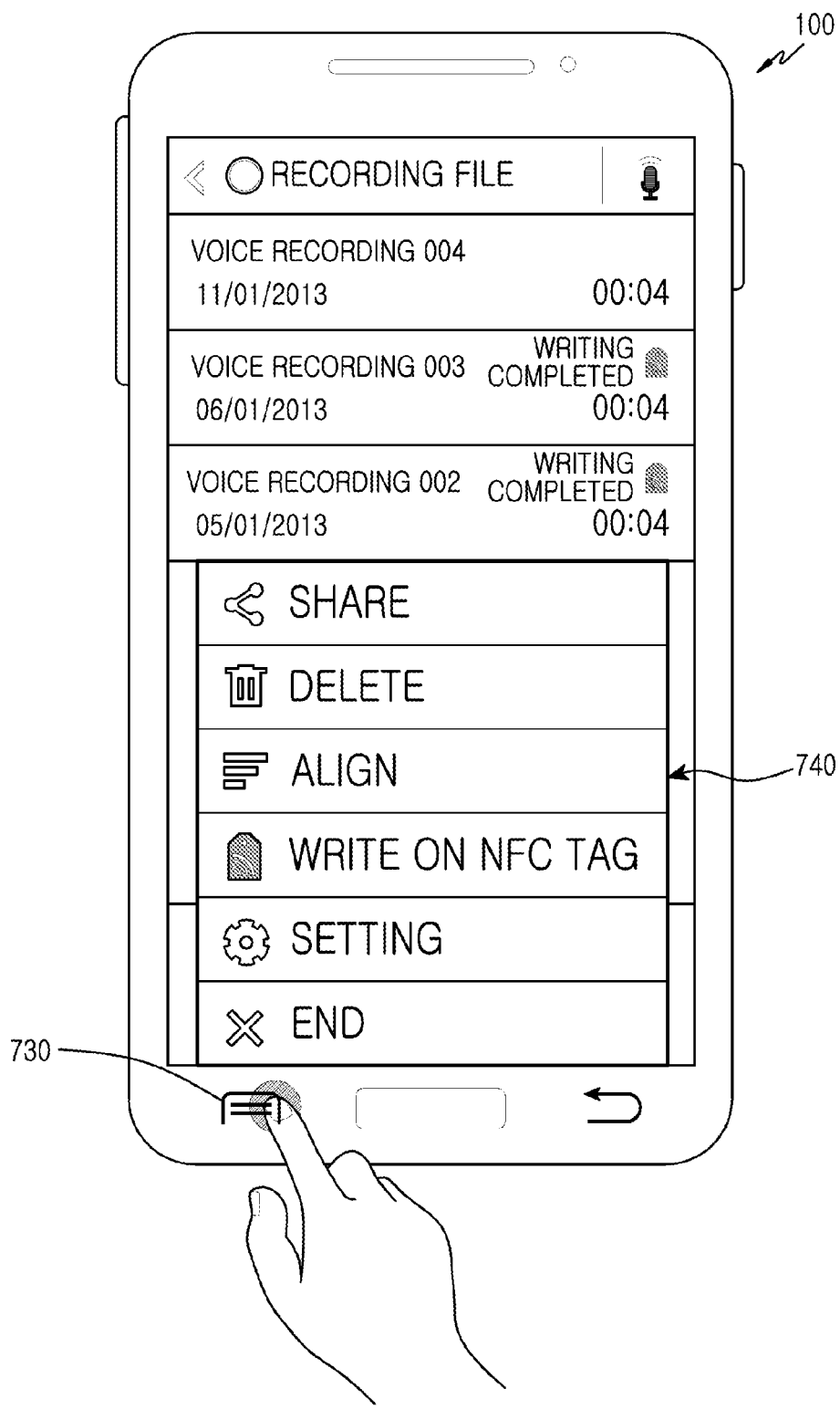
Figure 7E:
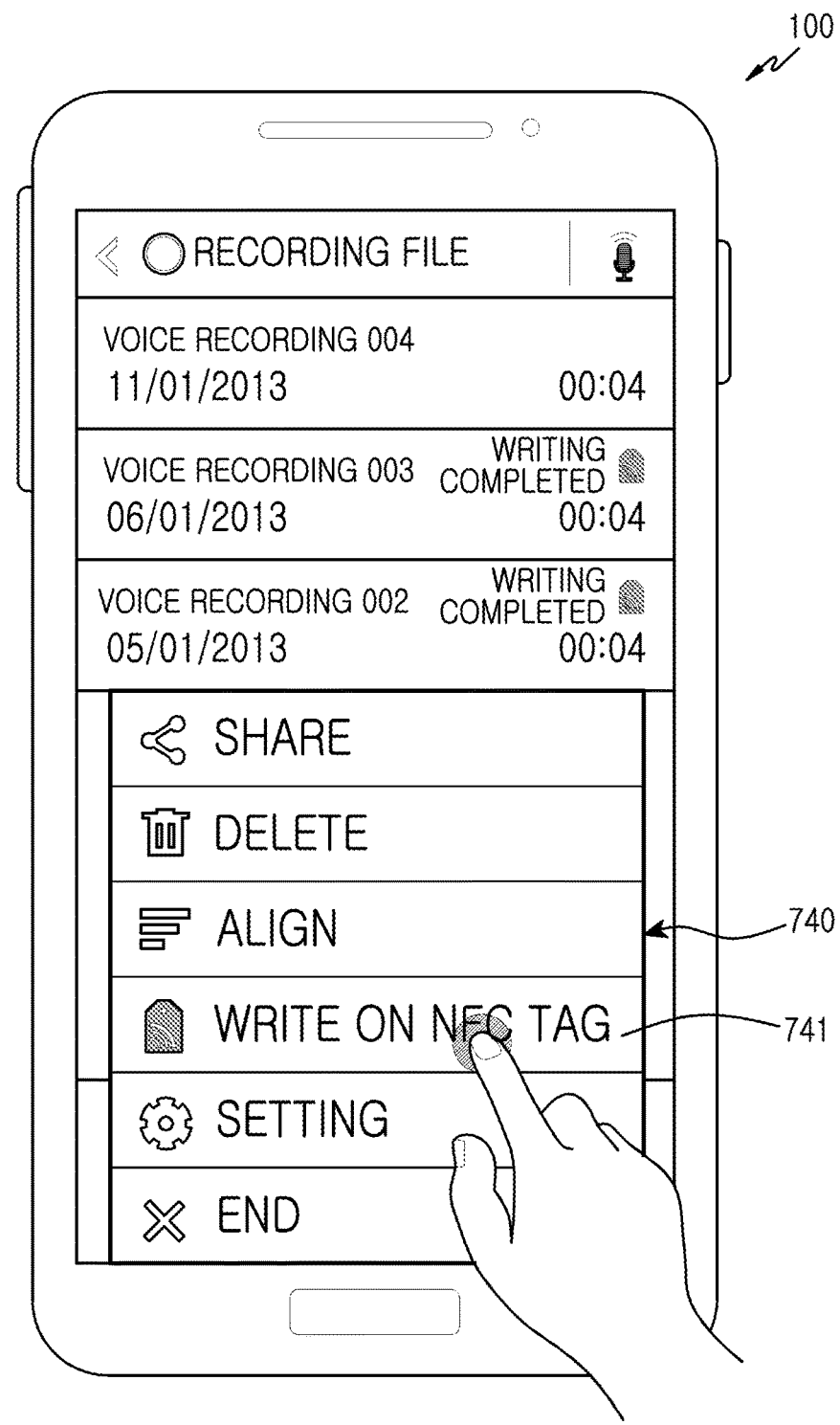
Figure 7F:
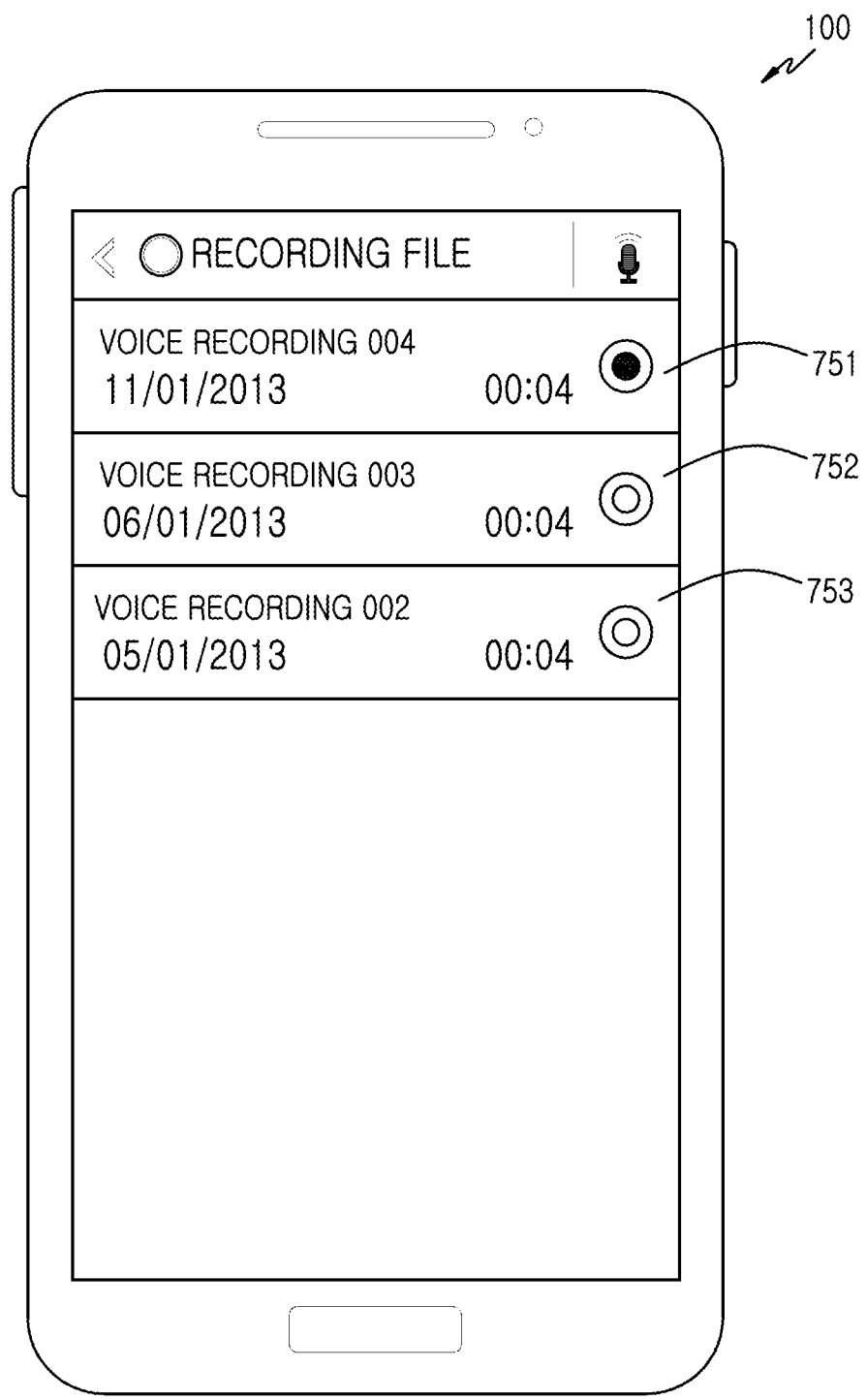
Figure 7G:
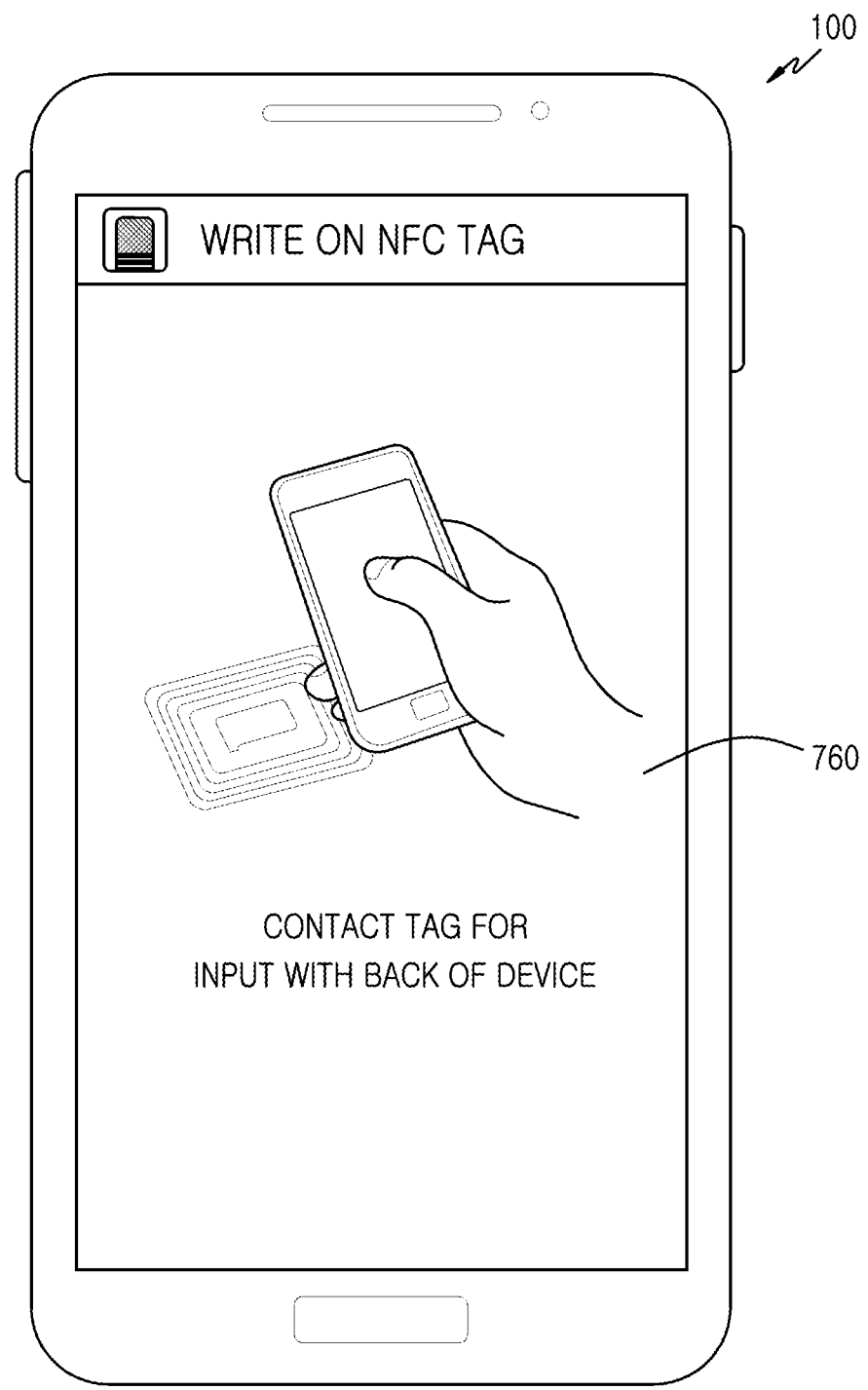

According to an embodiment of the present disclosure, the electronic device 100 may store the generated voice file on the memory 110 of the electronic device 100 and as shown in, for example, FIG. 7C, may display voice file information 720 (see, for example, FIG. 7C) of a corresponding voice file. The voice file information 720 may include a variety of identification information, for example, a file path for a corresponding voice file, a file name, a file format, a file size, a creation date, a storage location, and terminal information. For example, the terminal information may include ID or IMEI information meaning the unique number of the electronic device 100.

According to an embodiment of the present disclosure, the voice file information 720 may include a symbol for checking in what memory device 10 a corresponding voice file is stored. Although not shown in the drawing, the symbol may further include identification information for notifying a user of the memory device 10 where a corresponding voice file is stored.

The electronic device 100 may enter an NFC write mode in operation 530.

As shown in, for example, FIGS. 7D to 7G, a user may display a function list window 740 (see, for example, FIG. 7D) by executing a function setting button 730 (see, for example, FIG. 7D) disposed at one side of the electronic device 100. Then, the user may perform an NFC write function of the electronic device 100 by executing an NFC write icon 741 (see, for example, FIG. 7E) included in the function list window 740. For example, the user may select at least one voice file from among voice files 751, 752, and 753 (see, for example, FIG. 7F) stored in the electronic device 100. Additionally, the electronic device 100 may output guide information 760 (see, for example, FIG. 7G) for explaining an operating method of the electronic device 100 to a user.

Referring back to FIG. 5, the electronic device 100 may determine whether a distance to the memory device 10 is within a reference distance in operation 540.

According to an embodiment of the present disclosure, the electronic device 100 may perform NFC by recognizing the proximity or contact with the memory device 10.

When the distance to the memory device 10 is less than the reference distance (YES in operation 540), the electronic device 100 may transmit a file path for a stored voice file to the memory device 10 in operation 550.

When the distance to the memory device 10 is greater than the reference distance (NO in operation 540), the electronic device 100 may wait and perform operation 540 at a later point when the memory device 10 may have moved to a location that is closer to the electronic device 100.

According to an embodiment of the present disclosure, the electronic device 100 may transmit a file path of a corresponding voice file to the memory device 10 through NFC. Additionally, the electronic device 100 may output a notification sound when a corresponding file path is normally transmitted to the memory device 10. The memory device 10 may store the received file path.

Additionally, the electronic device 100 may store information of the memory device 10 on the memory 110 of the electronic device 100 while transmitting the file path to the memory device 10.

According to an embodiment of the present disclosure, the electronic device 100 may omit operation 520 and operation 530 after operation 510. For example, while generating a voice file in operation 510 or when it is detected that a distance to the memory device 10 is within a reference distance during playback after the generation, the electronic device 100 may recognize this and may transmit a file path for the voice file to the memory device 10.

According to various embodiments of the present disclosure, this embodiment is described with the electronic device 100 applying a voice file through a voice application but the present disclosure is not limited thereto. For example, the electronic device 100 may generate an image file through a camera application and may transmit a file path for the image file to the memory device 10. In this embodiment, an operating method of the electronic device 100 using NFC is described but the present disclosure is not limited thereto. For example, the electronic device 100 may implement this embodiment through a corresponding communication method according to a communication module included in the memory device 10.

An instruction set for each operation may be stored as at least one module in the memory 110. In this case, a module stored in the memory 110 may be executed by at least one processor 122.

Figure 6:
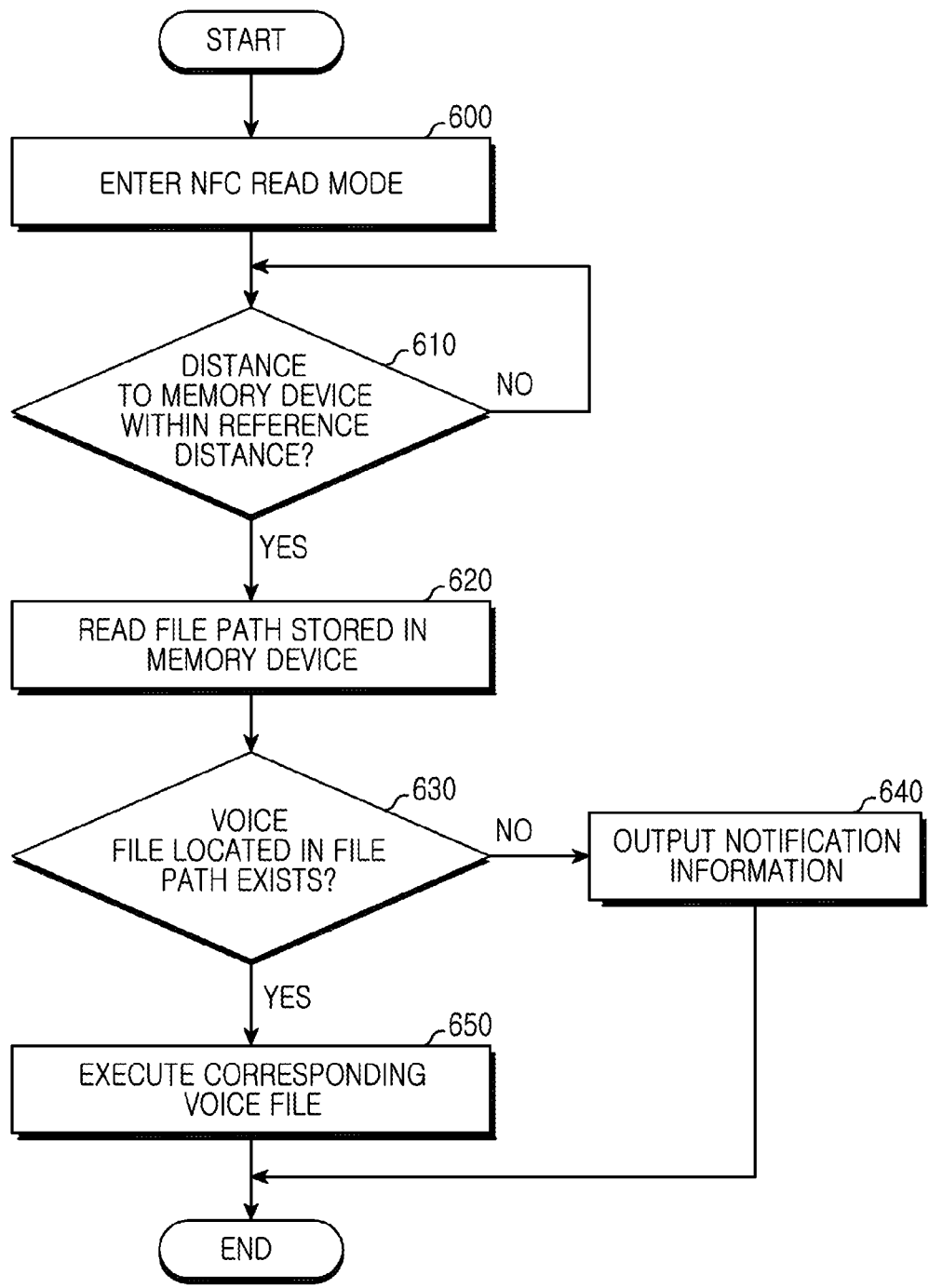
FIG. 6 is a flowchart illustrating an operating method of an electronic device according to an embodiment of the present disclosure.

FIG. 6 is a flowchart illustrating an operating method of an electronic device according to an embodiment of the present disclosure.

Figure 8:
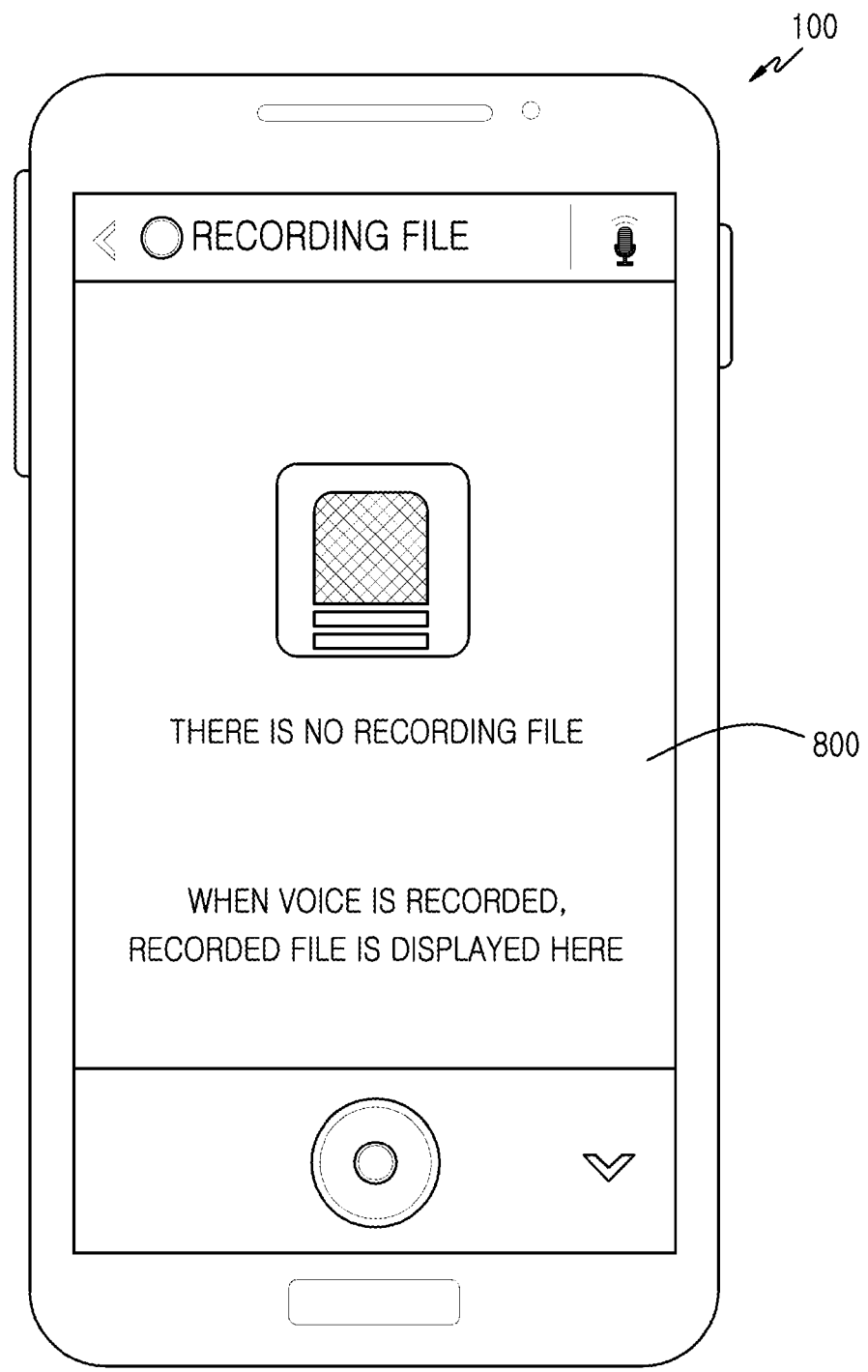
FIG. 8 is a view illustrating notification information according to an embodiment of the present disclosure.

Referring to FIG. 6, an operating method of an electronic device 100 is illustrated, where the electronic device 100 may enter an NFC read mode in operation 600. The following descriptions of the operations illustrated in FIG. 6 refer to the notification information illustrated in FIG. 8, where FIG. 8 is a view illustrating the notification information according to an embodiment of the present disclosure.

According to an embodiment of the present disclosure, the electronic device 100 may switch an operating mode of the electronic device 100 into the NFC read mode and may then perform an NFC read function.

The electronic device 100 may determine whether a distance to the memory device 10 is within a reference distance in operation 610.

According to an embodiment of the present disclosure, the electronic device 100 may perform NFC by recognizing the proximity or contact with the memory device 10.

When the distance to the memory device 10 is less than the reference distance (YES is operation 610), the electronic device 100 may read a file path stored in the memory device 10 in operation 620.

When the distance to the memory device 10 is greater than the reference distance (NO in operation 610), the electronic device 100 may wait and perform operation 610 at a later point when the memory device 10 may have moved to a location that is closer to the electronic device 100.

According to an embodiment of the present disclosure, the electronic device 100 may read a file path stored in the memory device 10 by using NFC.

The electronic device 100 may determine whether there is a voice file located in the read file path in operation 630.

According to an embodiment of the present disclosure, the electronic device 100 may check whether there is a corresponding voice file in the memory 110 of the electronic device 100 by checking a file path stored in the memory device 10.

If the voice file located in the file path does not exist in the memory 110 of the electronic device 100 (NO in operation 630), the electronic device 100 may output notification information in operation 640. For example, as shown in FIG. 8, the notification information 800 may include at least one of text data, image data, and voice data, which notify that there is no corresponding voice file.

If the voice file located in the file path exists in the memory 110 of the electronic device 100 (YES in operation 630), the electronic device 100 may execute a corresponding voice file in operation 650.

According to an embodiment of the present disclosure, the electronic device 100 may play a voice file located in a file path. For example, the electronic device 100 may play a voice file pre-registered in the memory device 10 by accessing the memory device 10.

According to an embodiment of the present disclosure, the electronic device 100 may change of an output mode of the electronic device 100 at the time for reading a file path from the memory device 10. For example, when the output mode of the electronic device 100 is set to a mute mode, a vibration mode, or a sound mode of low volume, the electronic device may switch the mute mode or the vibration mode into the sound mode or a low volume of the sound mode into a high volume.

By applying the above embodiment, the electronic device 100 may play a voice file located in a file path.

According to various embodiments of the present disclosure, when the read file path is identical to a file path stored in the memory of the electronic device 100, the electronic device 100 may determine whether the read file path is a file path that the electronic device 100 writes or a file path that another electronic device writes through the read terminal information. When it is determined that the read file path is the file path that another electronic device writes through the terminal information, the electronic device 100 may not execute a corresponding file located in the file path.

In this embodiment, a voice file is described exemplarily but the present disclosure is not limited thereto. For example, besides the voice file, various files such as an image file, a video file, and a text file may be applied.

In this embodiment, an operating method of the electronic device 100 using NFC is described but the present disclosure is not limited thereto. For example, the electronic device 100 may implement this embodiment through a corresponding communication method according to a communication module included in the memory device 10.

An instruction set for each operation may be stored as at least one module in the memory 110. In this case, a module stored in the memory 110 may be executed by at least one processor 122.

According to the various embodiments, an electronic device may provide a user interface that intuitively operates by using a memory device.

Methods according to embodiments described in claims or the specification may be implemented in the form of hardware, software, or a combination of hardware and software.

In the case that methods are implemented with software, a computer readable storage medium storing at least one program (software module) may be provided. At least one program stored in a computer readable storage medium is configured to be executed by at least one processor in an electronic device. At least one program includes instructions for allowing an electronic device to execute methods according to embodiments described in claims and/or the specification of the present disclosure.

Such a program (software module or software) may be stored in random access memory, nonvolatile memory including flash memory, read only memory (ROM), electronically erasable programmable ROM (EEPROM), a magnetic disk storage device, compact disk ROM (CD-ROM), DVD, another form of optical storage device, or a magnetic cassette. Or, such a program may be stored in a memory configured with a combination of part or all of the above. Additionally, each configuration memory may be included in plurality.

Moreover, such a program may be stored in a detachable storage device that accesses an electronic device through a communication network such as internet, intranet, LAN, wireless LAN (WLAN), or storage area network (SAN) or a communication network configured with a combination thereof. Such a storage device may access an electronic device through an external port.

Additionally, an additional storage device on a communication network may access a portable electronic device.

It should be apparent that there are various methods for modifying the above-described embodiments that are within the scope of claims. That is, without departing from the scope of claims below, there are various methods for implementing the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
    in response to detecting an input for a file generated by an application, displaying a user interface (UI) for the file, the UI comprising objects, wherein each of the objects is usable for performing a function of the file;
    if detecting an input for an object among the objects, transmitting, to a memory device, information regarding the file through short range communication in response to detecting that a distance between the electronic device and the memory device is within a reference distance;
    receiving, from the memory device, information comprising a file path for the file and information for identifying the electronic device through the short range communication;
    identifying the file path for the file and the information for identifying the electronic device based on the received information from the memory device; and
    if the file path for the file corresponds the information for identifying the electronic device, executing the file based on the information from the memory device,
    wherein the object is usable for transmitting the information to the memory device, and
    wherein the UI comprises a symbol identifying the memory device which stores the information regarding the file.

2. The method of claim 1, wherein the information further comprises at least one of a name of the file, a format of the file, a size of the file, a storage location for the file, and a creation date of the file.

3. The method of claim 1, further comprising:
    receiving indication information from the memory device through the short range communication; and
    if the file corresponding to the indication information exists in the electronic device, executing the file based on the indication information.

4. The method of claim 3, further comprising changing an output mode of the electronic device at a time of receiving the file information from the memory device,
    wherein the output mode is one of a silent mode, a vibration mode, and a sound mode.

5. The method of claim 1, further comprising:
    displaying a UI comprising information for indicating the file.

6. The method of claim 3, further comprising, if the file corresponding to the indication information does not exist in the electronic device, outputting notification information notifying that no file exists in the electronic device.

7. The method of claim 1, wherein the memory device comprises a Near Field Communication (NFC) tag.

8. The method of claim 1, wherein the application is a pre-loaded application.

9. The method of claim 8, wherein the pre-loaded application is executed by a physical button disposed at one side of the electronic device.

10. The method of claim 1, wherein the file comprises at least one of a text file, an image file, a video file, and a voice file.

11. An electronic device comprising:
    at least one transceiver; and
    at least one processor operatively coupled to the at least one transceiver,
    wherein the at least one processor is configured to:
        in response to detecting an input for a file generated by an application, control to display a user interface (UI) for the file, the UI comprising objects, wherein each of the objects is usable for performing a function of the file,
        if detecting an input for an object among the objects, transmit, to a memory device, information regarding the file through short range communication by using the application in response to detecting that a distance between the electronic device and the memory device is within a reference distance;
        receive, from the memory device, information comprising a file path for the file and information for identifying the electronic device through the short range communication;
        identify the file path for the file and the information for identifying the electronic device based on the received information from the memory device; and
        if the file path for the file corresponds the information for identifying the electronic device, execute the file based on the information from the memory device,
    wherein the object is usable for transmitting the information to the memory device, and wherein the UI comprises a symbol identifying the memory device which stores the information regarding the file.

12. The electronic device of claim 11, wherein the file information further comprises at least one of a name of the file, a format of the file, a size of the file, a storage location for the file, and a creation date of the file.

13. The electronic device of claim 11, wherein the at least one transceiver is further configured to receive indication information from the memory device through the short range communication, and
    wherein the at least one processor is further configured to,
        if the file corresponding to the indication information exists in the electronic device, execute the file based on the indication information.

14. The electronic device of claim 13, wherein the at least one processor is further configured to change an output mode of the electronic device at a time of receiving the file information from the memory device, and
    wherein the output mode is one of a silent mode, vibration mode, and a sound mode.

15. The electronic device of claim 11, wherein the at least one processor is further configured to control to display a UI comprising information for indicating the file.

16. The electronic device of claim 13, wherein, when the file corresponding to the indication information does not exist in the memory of the electronic device, the at least one processor is further configured to control to output notification information notifying that no file exists in the electronic device.

17. The electronic device of claim 11, wherein the memory device comprises a Near Field Communication (NFC) tag.

18. The electronic device of claim 11, wherein the application is a pre-loaded application.

19. The electronic device of claim 11, wherein, when the at least one processor determines that the distance is not within the reference distance, the at least one processor is further configured to wait a predetermined amount of time and determine whether or not a distance between the memory device and the electronic device is within the reference distance.

20. The electronic device of claim 11, wherein the file comprises at least one of a text file, an image file, a video file, and a voice file.

\* \* \* \* \*